E. R. HIBBARD.
PROCESS OF MANUFACTURING LOCK NUTS.
APPLICATION FILED DEC. 9, 1914.

1,263,061. Patented Apr. 16, 1918.

Witnesses:

Inventor:
Edward R. Hibbard

UNITED STATES PATENT OFFICE.

EDWARD R. HIBBARD, OF OAK PARK, ILLINOIS, ASSIGNOR TO GRIP NUT COMPANY, OF CHICAGO, ILLINOIS, A CORPORATION OF ILLINOIS.

PROCESS OF MANUFACTURING LOCK-NUTS.

1,263,061.         Specification of Letters Patent.     Patented Apr. 16, 1918.

Application filed December 9, 1914. Serial No. 876,214.

*To all whom it may concern:*

Be it known that I, EDWARD R. HIBBARD, a citizen of the United States of America, residing at Oak Park, in the county of Cook and State of Illinois, have invented certain new and useful Improvements in Processes of Manufacturing Lock-Nuts, of which the following is a description.

My invention belongs to that general class of devices known as grip nuts, in which a bolt nut is so constructed that it will engage the coöperating bolt in such a manner that it may not be accidentally disengaged therefrom by vibration or in ordinary use. To this end my invention consists in the novel process of manufacturing lock nuts herein shown and described, and to the process of manufacturing the same, resulting in the production of an effective grip nut at a reasonable cost.

In the drawings wherein like reference characters indicate like or corresponding parts, Figure 1 is a tranverse section through a grip nut embodying my improved construction;

Figure 1:
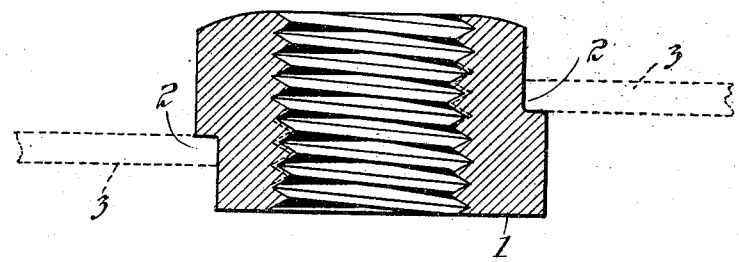
Figure 2:
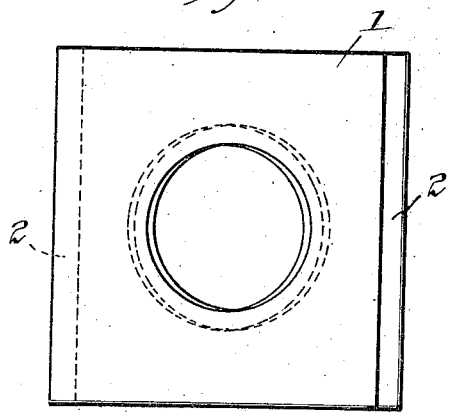
Fig. 2 is a plan view of the same.
Figure 3:
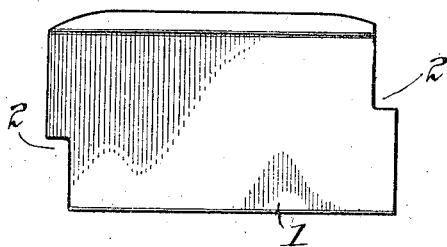
Fig. 3 is an edge view of the nut shown in Fig. 2.

In the preferred form shown in the drawings 1 represents a suitable nut blank, which has rolled upon the edges thereof channels 2, 2. As shown, these channels extend from about the middle line of the nut to the opposite sides thereof, and are arranged diagonally to each other. The nut is threaded in the usual manner to engage its coöperating bolt, and is thereafter firmly held against edge movement while tools 3, 3, preferably comparatively thin, so as not to extend to the faces of the nut positioned in the line of the channels as indicated, are forced toward each other sufficiently to distort the bolt hole on a line slightly diagonal and extending from one of said tools 3 toward the other. As shown, the parts are exaggerated to more clearly show the construction. It is obvious that but a slight change from the normal is necessary in order to cause the nut to firmly grip or bind upon the coöperating bolt at the distorted points. As the pressure is applied in the manner shown in the drawings, the tendency is to cause the bolt hole near the center of the nut to yield in the direction of the line of least resistance and so become slightly oval in shape. While this is the preferred construction it is obvious that the nut may be similarly constructed on the other two edges to square the bolt hole at that point. The form illustrated in the drawings is preferred, as stated, although the other construction is considered within the spirit of my invention. Nuts constructed in this manner may be readily engaged with the coöperating bolt at either face, but will bind upon the bolt as the nut is turned down thereon and the distorted portion of the nut reaches the bolt threads.

If the tools 3, instead of being thin, as indicated, should be thick enough to reach substantially to the face of the nut on each side, then the construction, while being substantially the same at the central portion of the nut, would be modified in the wall of the bolt hole adjacent to the tool in each case by a slight distortion. That is, while one side of the bolt hole on each face would be substantially normal, owing to the increased thickness of the wall on that side, the opposite side would be slightly abnormal. Such construction, however, is considered inferior to the method heretofore described, in view of the fact that it is likely to interfere to a greater or less extent with initially threading the nut on the bolt. The same would be true, of course, if the nut were transversely compressed from the four sides instead of from two.

It is obvious that if desired the channels 2, 2, or either of them, may be omitted. In either case, however, the method is believed to be inferior. In the first instance because of the increased pressure necessary to secure satisfactory results, owing to the increased thickness of the walls, and consequent risk to the machinery, as well as the uniform construction of the nut, and in the second instance because of the variation in the opposite side walls of the bolt hole, owing to the fact that the material on one side was thicker and consequently more rigid than the other. In each case, however, the process and nut would be within the spirit of my invention in all cases, when like results were secured, even if such were inferior to the preferred process and product set forth.

What I claim as new and desire to secure by Letters Patent is:—

1. The process of forming a grip nut, consisting in taking a threaded nut blank and compressing the same near the middle portion transversely to the bolt hole, but slightly diagonal thereto, to slightly distort and ovalize the form of the bolt hole in the line of pressure.

2. The process of forming a grip nut, consisting in taking a nut blank, provided with channels on opposite edges of the nut, extending from a point near the middle line of the nut toward the opposite faces thereof, and screw-threading the nut in the usual manner, and then compressing the nut near its middle part, in line with the channels, and transversely to the bolt hole to slightly distort the bolt hole on the line of pressure.

In testimony whereof, I have hereunto signed my name in the presence of two subscribing witnesses.

EDWARD R. HIBBARD.

Witnesses:
JOHN W. HILL,
CHARLES I. COBB.

Copies of this patent may be obtained for five cents each, by addressing the "Commissioner of Patents, Washington, D. C."